United States Patent Office 3,345,425
Patented Oct. 3, 1967

3,345,425
PREPARATION OF CYCLOHEXENE
Charanjit Rai, Bellwood, Ill., assignor to Union Oil Company of California, Los Angeles, Calif., a corporation of California
No Drawing. Filed Oct. 18, 1965, Ser. No. 497,455
5 Claims. (Cl. 260—666)

This invention relates to a method for dehydrating cyclohexanol to cyclohexene.

Various methods for dehydrating cyclohexanol to cyclohexene are known, including the use of phosphoric acid or sulfuric acid as dehydrating catalysts. Sulfuric acid has the disadvantage of producing charring if the reaction is not carefully regulated, and producing undesirable by-products. Phosphoric acid produces low yields of cyclohexene.

I have discovered that cyclohexanol can be dehydrated to cyclohexene in the presence of polyphosphoric acid or a mixture of polyphosphoric and sulfuric acids with resultant high yields of cyclohexene and reduced production of undesirable by-products. Cyclohexene is a valuable starting material in the preparation of nylon, caprolactam and cyclohexylamine.

In accordance with my invention, cyclohexanol is heated in the presence of polyphosphoric acid or a mixture of polyphosphoric acid and sulfuric acid to a temperature above the boiling point of cyclohexene. The polyphosphoric acid or mixture thereof with sulfuric acid catalyzes the dehydration of the cyclohexanol to cyclohexene and the resulting cyclohexene and water are distilled overhead and are condensed, after which the water is separated from the cyclohexene. The cyclohexene is washed with brine and dried over anhydrous calcium sulfide. Although polyphosphoric acid alone may be used as the dehydrating catalyst, I prefer to use a mixture of polyphosphoric acid and sulfuric acid since the mixture gives substantially higher yields of cyclohexene without formation of any significant amount of by-products.

The polyphosphoric acid used in accordance with my invention contains more phosphorus pentoxide than that corresponding to orthophosphoric acid (above 72.4% and preferably about 85% of phosphorus pentoxide). Such acid is composed of mixtures of ortho-, pyro-, tri- and hexa-meta-phosphoric acid. The polyphosphoric acids, also known as strong phosphoric acids, are described at page 647 of Inorganic Chemistry, by Moeller, published 1957 by John Wiley & Sons, Inc., New York.

When using a mixture of polyphosphoric acid and sulfuric acid, I prefer to use equal volumes of the acids in the mixture although other proportions may be used ranging from 5 parts to 95 parts of polyphosphoric acid to 95 to 5 parts of sulfuric acid by volume. The reaction may be carried out at temperatures ranging from the boiling point of cyclohexene (83° C.) to the boiling point of cyclohexanol in the presence of the catalyst and allowing the cyclohexene to distill from the reaction mixture. Alternatively, the reaction may be carried out at temperatures ranging from the boiling point of cyclohexanol to the initial boiling point of polyphosphoric acid by passing vaporized cyclohexanol through the catalyst. For vapor phase operation the polyphosphoric acid may be incorporated in a solid adsorptive material in the same manner as phosphoric acid is incorporated in U.S. Patent No. 2,202,104. Where the reaction is carried out by heating the cyclohexanol in the presence of the catalyst and distilling cyclohexene from the reaction mixture, good results are obtained using 1 part by volume of the catalyst to 10 parts by volume of the cyclohexanol. The ratio of the amount of catalyst to the amount of cyclohexanol may depart from the aforesaid ratio of 1 to 10, without departing from the invention.

In order to demonstrate the invention, a series of runs was made in which cyclohexanol was distilled in separate experiments in the presence of sulfuric acid, polyphosphoric acid containing 85% of $P_2O_5$, a mixture of equal parts of the aforesaid polyphosphoric acid and sulfuric acid (93.5% concentration), phosphoric acid and a mixture of phosphoric and sulfuric acids. In each experiment 100 cc. of cyclohexanol were distilled over 10 cc. of the catalyst. The results are given in the following Table I.

TABLE I.—DEHYDRATION OF CYCLOHEXANOL TO CYCLOHEXANE

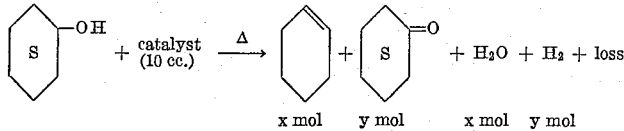

| Product | Catalyst | | | | | | | | | | | | | | |
|---|---|---|---|---|---|---|---|---|---|---|---|---|---|---|---|
| | H₂SO₄ | | | PPA | | | PPA-H₂SO₄ (50-50) | | | H₃PO₄ | | | H₃PO₄-H₂SO₄ | | |
| | B.P., °C. | R.I. | Percent Yield | B.P., °C. | R.I. | Percent Yield | B.P., °C. | R.I. | Percent Yield | B.P., °C. | R.I. | Percent Yield | B.P., °C. | R.I. | Percent Yield |
| (cyclohexene) | 80-82 | $n_D^{20}$ 1.4550 | 82 | 79-84 | $n_D^{20}$ 1.4453 | 80 | 81-82 | $n_D^{20}$ 1.4450 | 98 | 70-80 | $n_D^{22}$ 1.4432 | 20 | 80-90 | $n_D^{25}$ 1.4441 | 79.6 |
| (cyclohexanone, S=O) | ------ | ------ | ------ | 155-158 | $n_D^{20}$ 1.4631 | 10 | ------ | ------ | ------ | ------ | ------ | ------ | ------ | Trace | ------ |
| (cyclohexanol, S-OH) | ------ | ------ | ------ | ------ | ------ | ------ | ------ | ------ | ------ | 150-160 | $n_D^{22}$ 1.4652 | 70 | 150-160 | $n_D^{25}$ 1.4608 | 17.3 |
| Loss | ------ | ------ | 18 | ------ | ------ | 10 | ------ | ------ | 2 | ------ | ------ | 10 | ------ | ------ | 3.1 |

It will be seen from the results in Table I that the mixture of polyphosphoric acid (PPA) and sulfuric acid gave a yield of 98% of cyclohexene with only a 2% loss. Sulfuric acid alone produced only 82% of cyclohexene with 18% loss. Polyphosphoric acid alone gave a yield of 80% of cyclohexene, 10% hexanone and 10% loss. Phosphoric acid alone gave only a 20% yield of cyclohexene, and a mixture of phosphoric acid and sulfuric acid gave a yield of only 79% of cyclohexene.

Although commercial sulfuric acid was used in the experiments for which results are given in the table, it should be understood that $H_2SO_4$ of concentration from about 80% to and including oleum will operate satisfactorily. As used in the claims, "concentrated sulfuric acid" means acid having a concentration of at least 80% sulfuric acid.

It will be seen, therefore, that I have discovered a superior catalyst for dehydrating cyclohexanol to cyclohexene.

The embodiments of the invention in which an exclusive property or privilege is claimed are defined as follows:

1. A method of producing cyclohexene consisting of heating cyclohexanol in the presence of a mixture of about equal parts of polyphosphoric and concentrated sulfuric acids to a temperature sufficient to distill off cyclohexene and water, condensing the vapors and separating condensed cyclohexene from the remaining reaction product.

2. A method of producing cyclohexene consisting of contacting cyclohexanol vapors with a mixture of polyphosphoric acid and concentrated sulfuric acid at temperatures ranging from the boiling point of cyclohexanol to the initial boiling point of the polyphosphoric acid, the said mixture containing the proportions of 5 parts to 95 parts of polyphosphoric acid to 95 to 5 parts of sulfuric acid by volume.

3. A method of producing cyclohexene consisting of contacting cyclohexanol with a mixture of polyphosphoric acid and concentrated sulfuric acid at a temperature from at least the boiling point of the cyclohexene to the boiling point of the cyclohexanol, the said mixture containing the proportions of 5 to 95 parts of polyphosphoric acid and 95 to 5 parts of sulfuric acid.

4. The method in accordance with claim 3 in which the polyphosphoric and sulfuric acids are present in about equal amounts.

5. The method in accordance with claim 1 in which the cyclohexanol is heated to approximately its boiling point.

References Cited

UNITED STATES PATENTS

| | | | |
|---|---|---|---|
| 2,197,956 | 4/1940 | Vaughn | 260—666 |
| 2,916,528 | 12/1959 | Jones et al. | 260—666 |
| 3,167,595 | 1/1965 | Heywood et al. | 260—666 |
| 3,275,698 | 9/1966 | Parish | 260—666 |

OTHER REFERENCES

W. M. Dehn et al.: "J. Amer. Chem. Soc." vol. 55, p. 4285–4287, 1933.

J. B. Serendens: "Compt. Reud." vol. 154, p. 1168–70, 1912.

J. B. Serendens: "Compt. Reud." vol. 177, p. 1183–6, 1923.

PAUL M. COUGHLAN, JR., *Primary Examiner.*

DELBERT E. GANTZ, *Examiner.*

V. O'KEEFE, *Assistant Examiner.*